United States Patent
Katayama (10) Patent No.: US 8,893,568 B2
(45) Date of Patent: Nov. 25, 2014

(54) SELF-LUBRICATING TRANSMISSION DEVICE

(75) Inventor: Yoshitake Katayama, Aichi (JP)

(73) Assignee: Kamoseiko Kabushiki Kaisha, Aichi (JP)

( * ) Notice: Subject to any disclaimer, the term of this patent is extended or adjusted under 35 U.S.C. 154(b) by 440 days.

(21) Appl. No.: 13/239,545

(22) Filed: Sep. 22, 2011

(65) Prior Publication Data

US 2013/0008267 A1    Jan. 10, 2013

(30) Foreign Application Priority Data

Jul. 8, 2011    (JP) ................................ 2011-151653

(51) Int. Cl.
*F16H 57/04* (2010.01)
*F16H 19/04* (2006.01)

(52) U.S. Cl.
CPC .......... *F16H 57/0406* (2013.01); *F16H 57/045* (2013.01); *F16H 19/04* (2013.01)
USPC ........ 74/89; 74/415; 74/422; 74/465; 74/467; 184/102

(58) Field of Classification Search
CPC .... F16H 19/04; F16H 57/0406; F16H 57/045
USPC ............... 74/89, 415, 422, 465, 467; 184/102
See application file for complete search history.

(56) References Cited

U.S. PATENT DOCUMENTS

| | | | | |
|---|---|---|---|---|
| 1,140,427 A * | 5/1915 | Wilson | ............................ | 74/465 |
| 1,200,203 A * | 10/1916 | Kroyer | ............................ | 74/465 |
| 2,813,599 A * | 11/1957 | Amberg | ........................ | 184/16 |
| 2,852,097 A * | 9/1958 | Proctor | ......................... | 184/18 |
| 2,909,937 A * | 10/1959 | Williams | ....................... | 474/91 |
| 4,175,642 A * | 11/1979 | Bianchi et al. | ............... | 184/109 |
| 6,023,989 A * | 2/2000 | Imase et al. | .................... | 74/422 |
| 2007/0289401 A1* | 12/2007 | Silbermann | ................. | 74/433.5 |
| 2012/0090415 A1* | 4/2012 | Lim | ............................. | 74/89.17 |
| 2012/0174690 A1* | 7/2012 | Lim | ................................ | 74/29 |
| 2013/0025386 A1* | 1/2013 | Callahan et al. | ................. | 74/89 |

FOREIGN PATENT DOCUMENTS

| | | |
|---|---|---|
| JP | 08-034354 A | 6/1996 |
| JP | 10-184842 | 7/1998 |
| JP | 2000-65176 A | 3/2000 |

\* cited by examiner

*Primary Examiner* — Troy Chambers
*Assistant Examiner* — Valentin Craciun
(74) *Attorney, Agent, or Firm* — Morgan, Lewis & Bockius LLP (57) ABSTRACT

In a self-lubricating transmission device 1, a compression helical spring 15 is provided to urge an impregnation metal 14 as an impregnation means so as to slidably contact the impregnation metal 14 with pin rollers 7. In combination with a rotational movement of a pinion 6, the pin rollers 7 slide on a lower surface 14d of the impregnation metal 14 to supply a lubrication oil W to the pin rollers 7 so as to automatically lubricate the pinion 6 evenly at the right time for an appropriate amount of the lubrication oil W. This obviates the lubrication oil W being wastefully used, while at the same time, making a lubrication work quick, labor-saving and user-friendly.

2 Claims, 8 Drawing Sheets

A-A cross section

SELF-LUBRICATING TRANSMISSION DEVICE

BACKGROUND OF THE INVENTION

1. Field of the Invention

The present invention relates to a self-lubricating transmission device in which a pinion has a plurality of pin rollers, some of which engage with a rectilinear rack, particularly concerns to a self-lubricating transmission device which is improved to automatically supply the lubrication oil to the pinion when actuated to rotate the pinion along the rack.

2. Description of Related Art

A rack combined with a pinion has been known as a rack-and-pinion type steering device or a rack-and-gear device as disclosed by Japanese Laid-open Patent Application Nos. 08-34354 and 2000-65176 (each referred to as first and second reference hereinafter).

The first reference teaches that a helical spring is used as an urging means to absorb a displacement of the rack through a rotational movement of a rack guide means when a distance between the rack and the pinion fluctuates so as to reduce a frictional quantity of the rack guide means during the operation.

The second reference teaches that an elastic member is provided at a position lower than an addendum flank of the gear is placed. When the device is actuated, the gear is brought into engagement with the rack through an urging force of an intermediary elastic member so as to mitigate an induced level of noise and vibration.

Japanese Laid-open Patent Application No. 10-184842 (referred to as third reference hereinafter) teaches that racks are applied to a pinion device which requires a lengthened stroke upon transferring a factory robot, a component part stocker or a washing line.

In recent years, it may be necessary in big electronic factories to transfer bundles of ultra-thin vitreous sheets for an extended distance along the rectilinear rack so that the thin vitreous sheets are applied to liquid-crystal displays in an assembly location. In this instance, it is quintessential to lubricate the pinion in order to maintain a smooth engagement with the rack so as to provide the pinion with a swift and low-noise rotational movement.

In order to lubricate the pinion as an oil-supplying work, it requires a user to employ a spatula so as to manually take some lumps of grease out of a solid oil container.

This makes the oil-supplying work often and rendering the oil-supplying work time-consuming and costly. It is often the case with the oil-supplying work to wastefully supply a larger amount of the grease to the pinion for the fear that the grease will run out while actuating the pinion.

Especially upon employing the extended racks, it becomes necessary to manually supply the grease to the pinion along the extended racks to make the oil-supplying work laborious.

Therefore, the present invention has been made with the above drawbacks in mind, it is a main object of the invention to provide a self-lubricating transmission device which is capable of automatically lubricating the pinion evenly at the right time for an appropriate amount of a lubrication oil, this obviating the lubrication oil being wastefully used, while at the same time, making a lubrication work quick, labor-saving and user-friendly.

SUMMARY OF THE INVENTION

According to the present invention, there is provided a self-lubricating transmission device in which a rack is provided on which a multitude of teeth is continuously formed along a lengthwise direction of the rack. A pinion has a plurality of pin rollers which are provided between two disc plates in a fashion to form an annular configuration so as to engage with the teeth of the rack. A gate-shaped housing has a ceiling plate and side walls connected to both ends of the ceiling plate in order to accommodate the pinion inside the housing. A drive shaft is concentrically fixed to a central portion of the pinion. One end of the drive shaft is rotatably supported by one of the side walls, and the other end of the drive shaft is rotatably supported by the other of the side walls. A lubrication means accommodates lubrication oil and provided between the ceiling plate and the pinion to be in registration with the pinion. The pinion is rotationally driven to move in relative to the rack with the pin rollers engaged with the teeth of the rack, so that the lubrication means supplies the lubrication oil to the pinion in combination with the rotational movement of the pinion.

Such is the structure that the lubrication means supplies the lubrication oil to the pinion in combination with the rotational movement of the pinion, it is possible to automatically lubricate the pinion evenly at the right time for an appropriate amount of the lubrication oil. This obviates the lubrication oil being wastefully used, while at the same time, making a lubrication work quick, labor-saving and user-friendly. Even in the case in which a plurality of racks are added to lengthen its entire stroke, it is not necessary to manually supply the lubrication oil to the pinion for the extended distance, thereby making a lubrication work labor-saving.

According to other aspect of the present invention, the lubrication means has an outer shell formed in arc along an outer peripheral surface of the pinion. An impregnated means contains the lubrication oil and placed along the outer shell. An urging means urges the lubrication means to slidably contact the lubrication means with the pin rollers of the pinion.

Since the urging means urges the lubrication means to slidably contact the lubrication means with the pin rollers of the pinion, it is possible to automatically supply the lubrication oil to the pinion in proper quantities.

According to other aspect of the present invention, the lubrication means is an impregnation metal which impregnates the lubrication oil into a sintered alloy. Alternatively, the lubrication means is an impregnation synthetic resin which impregnates the lubrication oil into a porous synthetic resin.

Since the lubrication means is made from an available existent material, it is advantageous in terms of cost-effectiveness.

According to other aspect of the present invention, the lubrication means has an accommodation vessel which has the lubrication oil inside the vessel and formed in arc along an outer peripheral surface of the pinion. A plurality of nozzles is provided along a circumferential direction of a bottom portion of the accommodation vessel, so that the accommodation vessel supplies the lubrication oil flowing through the nozzles to lubricate the pin rollers.

Such is the structure that the lubrication oil flows through the nozzles to consistently drop on the pin rollers. It is possible to automatically supply the lubrication oil to the pinion in proper quantities.

According to other aspect of the present invention, a tubular screw joint bolt is provided on the ceiling plate of the housing in a fashion to face inside the accommodation vessel, so that the lubrication oil is refilled through the screw joint bolt.

Such is the structure that the screw joint bolt is provided on the ceiling plate of the housing. This makes it possible to readily refill the lubrication oil with the accommodation vessel by applying a grease gun as a special tool to the screw joint bolt.

BRIEF DESCRIPTION OF THE DRAWINGS

A preferred form of the present invention is illustrated in the accompanying drawings in which.

DETAILED DESCRIPTION OF PREFERRED EMBODIMENTS

In the following description of the depicted embodiments, the same reference numerals are used for features of the same type. Positions and directions of the various members are used to correspond to right-left sides, and up-down sides of the attached drawings throughout each embodiment of the invention.

Figure 1:
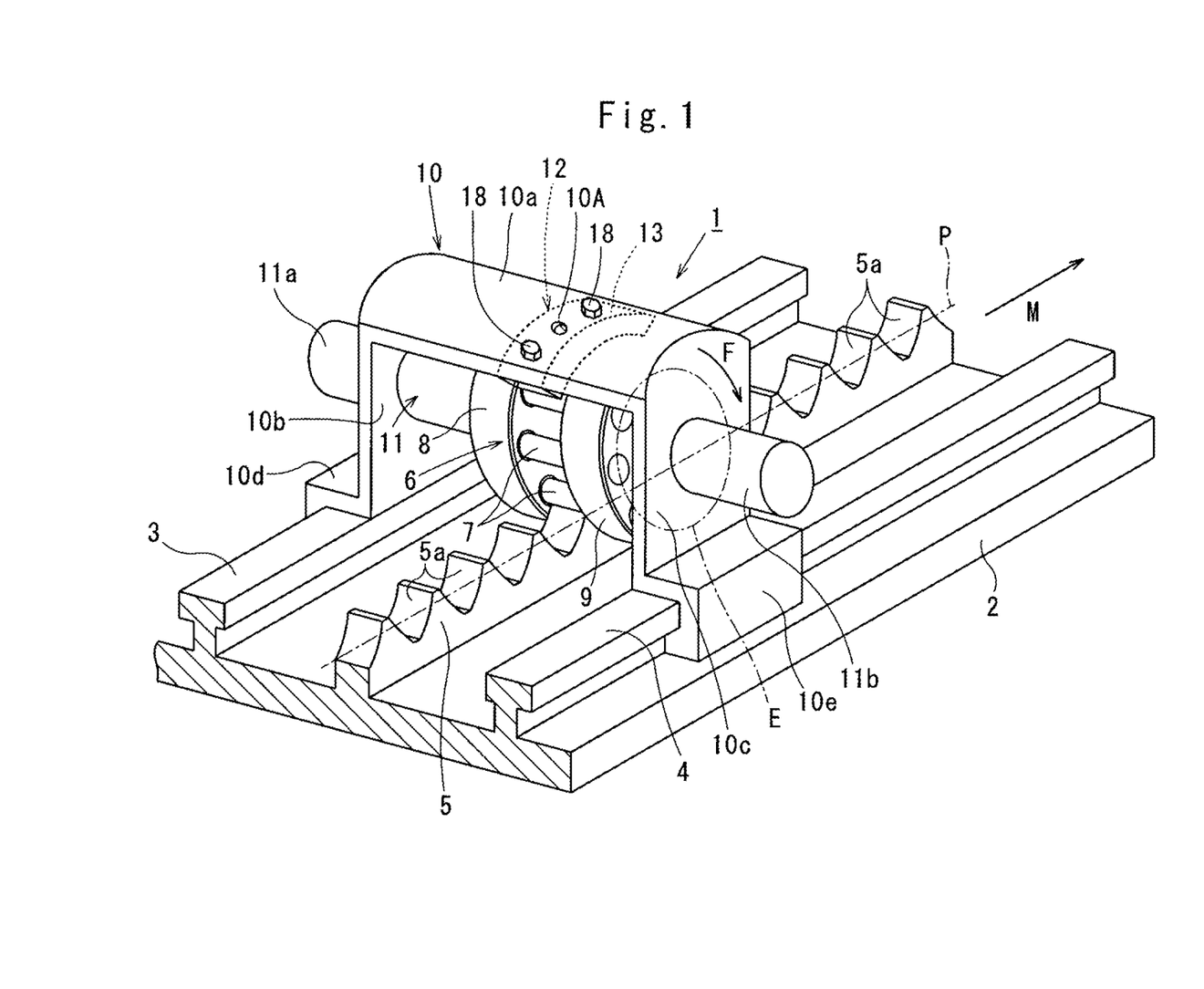
FIG. 1 is a perspective view of a self-lubricating transmission device according to a first embodiment of the invention.

Referring to FIGS. 1 through 4 which show a self-lubricating transmission device 1 according to a first embodiment of the invention, the self-lubricating transmission device 1 has a base plate 2 provided on a ground surface (not shown). A right and left side of the base plate 2 have rails 3, 4 as a paired construction as shown in FIG. 1. At a central section between conveyance rails 3, 4, a rectilinear rack 5 is placed along its lengthwise direction M. The rack 5 has a length dimension depending on what object the self-lubricating transmission device 1 is used for.

On an upper surface of the rack 5, there is provided many teeth 5a continuously formed based on a cycloidal profile along a pitch line P. A pinion 6 has a plurality of pin rollers 7, some of which engage with the teeth 5a of the rack 5, so that the pinion 6 rotates to run along the rack 5. By way of example, the number of the pin rollers 7 is ten with the pin rollers 7 interposed between two opposed disc plates 8, 9. The pin rollers 7 are placed circumferentially along a pitch circle E at regular intervals (e. g., 36 degrees) in a fashion to constitute the pinion 6 as an annular configuration.

A gate-shaped housing 10 is provided which has a ceiling plate 10a and side walls 10b, 10c formed in turn at the right end and left end of the ceiling plate 10a so as to accommodate the pinion 6.

The ceiling 10a is located to cover an upper peripheral surface of the pinion 6 while the side walls 10b, 10c are located at the right side and left side of the rack 5 in a fashion to interpose the rack 5 therebetween.

At basal sections of the corresponding side walls 10b, 10c, angular walls 10d, 10e are provided symmetrically in a fashion to interpose the rack 5 therebetween. On the one angular wall 10d, the conveyance rail 3 is slidably mounted, and the other conveyance rail 4 is slidably mounted on the other angular wall 10e.

A drive shaft 11 is fixedly secured to a central portion of the pinion 6. One end 11a of the on drive shaft 11 is rotatably mounted on the side wall 10b, and the other end 11b of the drive shaft 11 is rotatably mounted on the other side wall 10c.

To the drive shaft 11, connected is a rotary shaft of an electric motor (each not shown) which is placed on the housing 10. Upon energizing the electric motor, the motor transmits the rotational movement to the pinion 6 through the drive shaft 11 in the clockwise direction as designated at an arrow F in FIG. 1. Then, the pinion 6 rotates with the pin rollers 7 engaged with teeth 5a of the rack 5, so that the housing 10 slides through the angular walls 10d, 10e along the conveyance rails 3, 4 in the lengthwise direction M.

Figure 2:
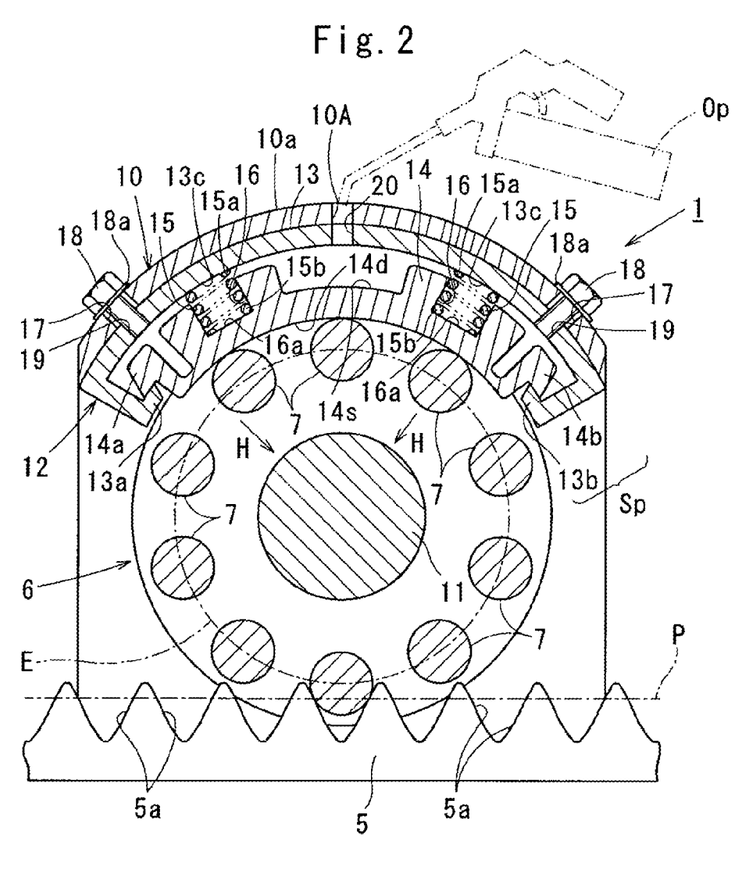
FIG. 2 is a longitudinal cross sectional view of the self-lubricating transmission device.
Figure 4:
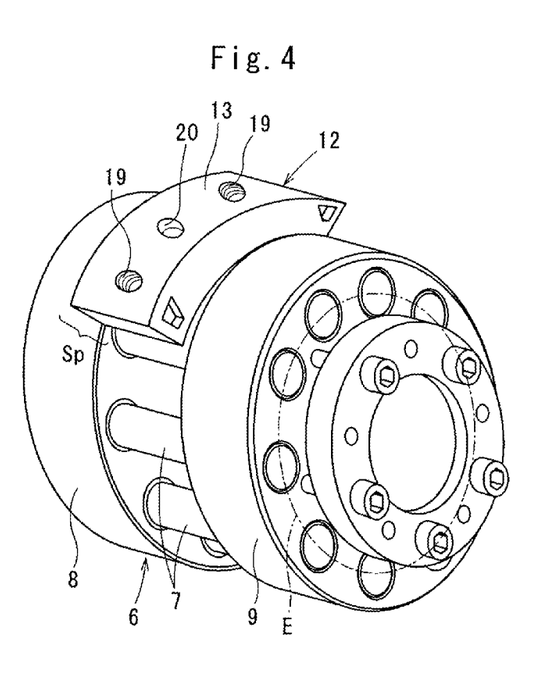
FIG. 4 is a perspective view of the lubrication means and the pinion.

Between an inner surface of the ceiling 10a and an outer peripheral surface of the pinion 6, a hollow space Sp is provided to place a lubrication means 12 within the hollow space Sp to be in registration with the pinion 6 as shown in FIGS. 2, 4.

The lubrication means 12 has an outer shell 13 formed in arc along the outer peripheral surface of the pinion 6 and having an impregnation means 14 placed within the outer shell 13. The impregnation means 14 has a lubrication oil W and a compressive helical spring 15, the latter of which acts as an urging means.

The outer shell 13 is made of a metallic material or synthetic resin and has an opening at a lower portion of the outer shell 13. At a right and left end side of the lower opening, there are provided hook portions 13a, 13b. The impregnation means 14 has an arcuately curved plate corresponding to the outer shell 13. One end of the impregnation means 14 has a pawl portion 14a elastically engaged with the hook portion 13a, and the other end of the impregnation means 14 has a pawl portion 14b elastically engaged with the hook portion 13b. At a right and left portion of the impregnation means 14, provided are bottom-ended holes 16 which accommodate the compressive helical spring 15.

An upper end 15a of the compressive helical spring 15 is in an elastic contact with an inner surface 13c of the outer shell 13, and a lower end 15b of the compressive helical spring 15 is in an elastic contact with a basal bottom of the bottom-ended hole 16 of the outer shell 13.

Figure 3:
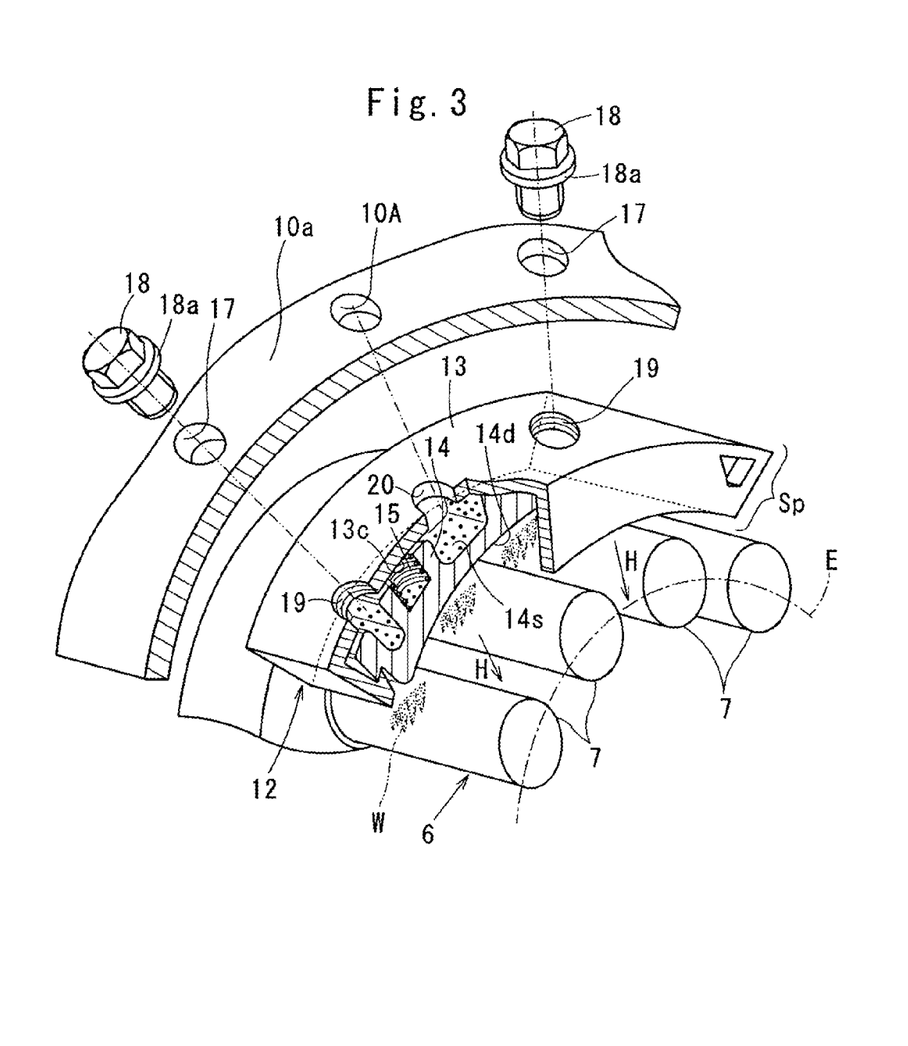
FIG. 3 is a perspective view of a ceiling plate and lubrication means, pinion and screw bolts but partly broken.

As designated at an arrow H in FIGS. 2, 3, the compressive helical spring 15 develops a urging force in such a direction as to slidably contact a lower surface 14d of the impregnation means 14 against the pin rollers 7.

The impregnation means 14 is an impregnation metal in which lubrication oil is impregnated with a sintered alloy. As the lubrication oil, a mineral oil, hydrocarbonate-based, fluoro-based, ester-based, ether-based synthetic oil or liquid grease may be used.

The lubrication oil of low viscosity is used at a high speed under a low load condition while the lubrication oil of high viscosity is used at a low speed under a high load condition.

As an additive of the lubrication oil, alkyldithioline acid zinc (Zn-DTP), sulfur-based, phospho-based extreme-pressure lubricant, alco-based oil agent, fatty acid ester-based oil agent, oxidation inhibiting agent or corrosion-resistant agent may be used.

As an alternative of the impregnation metal, used may be an impregnation synthetic resin in which the lubrication oil is impregnated with a porous synthetic resin.

Reverting to FIG. 3, a passage hole 17 is provided at the right and left side of the ceiling plate 10a corresponding to the area in which the outer shell 13 is located. The outer shell 13 has a screw hole 19, to which a screw bolt 18 is tightened through the passage hole 17 by means of a washer 18a. By tightening the screw bolt 18 against the screw hole 19, the screw bolt 18 fixedly secures the outer shell 13 to the inner surface of the ceiling plate 10a.

At a central portion of the outer shell 13, provided is a perforation hole 20 which is in communication with a recessed portion 14s imparted to the impregnation means 14. The perforation hole 20 is also in communication with a lubricant hole 10A, through which the lubrication oil is replenished to the impregnation means 14 with the use of a grease gun Op.

With the structure thus described, the energized motor transmits the rotational movement to the pinion 6 through the drive shaft 11 in the clockwise direction F. The pinion 6 rotates with the pin rollers 7 engaged with teeth 5a of the rack 5, so that the housing 10 slides through the angular walls 10d, 10 along the conveyance rails 3, 4 in the lengthwise direction M. This makes it possible to transfer the bundles of the ultra-thin vitreous sheets (not shown) from a material deposit to an assembly location in order to apply the vitreous sheets to the liquid-crystal displays after placing the vitreous sheets on a pallet (not shown) secured to the housing 10.

In this instance, the compressive helical spring 15 urges the impregnation means 14 to slidably contact against the pin rollers 7, so that the pin rollers 7 slide along the lower surface 14d of the impregnation means 14 in combination with the rotational movement of the pinion 6.

This makes it possible to consistently drop the lubrication oil W down to the pin rollers 7 so as to automatically lubricate the pinion 6 evenly at the right time for an appropriate amount of the lubrication oil W. This obviates the lubrication oil W being wastefully used, while at the same time, making a lubrication work quick, labor-saving and user-friendly. Even in the case in which a plurality of racks are added to lengthen its entire stroke, it is not necessary to manually supply the lubrication oil W to the pinion 6 for the extended distance, thereby making a lubrication work labor-saving.

Since the lubrication means 14 is the impregnation metal or the impregnation synthetic resin, it is possible to make the lubrication means 14 from an available existent material, thereby rendering the lubrication means 14 advantageous in terms of cost-effectiveness.

Figure 5:
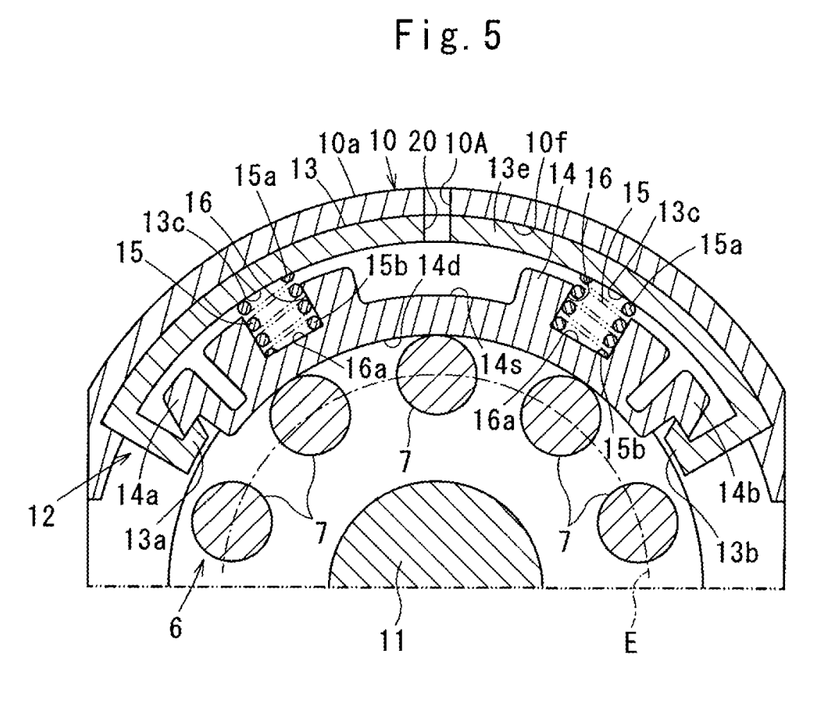
FIG. 5 is a longitudinal cross sectional view of the ceiling plate and the lubrication means and the pinion according to a second embodiment of the invention.

FIG. 5 shows a second embodiment of the invention in which the screw bolt 18 and the passage hole 17 are omitted, and a concavity 10f is provided on the inner surface of the ceiling plate 10a so as to correspond to the outer shell 13.

By interfitting an upper surface 13e of the outer shell 13 into the concavity 10f, it is possible to interpose the outer shell 13 between the ceiling plate 10a and the pinion 6, thereby fixedly securing the outer shell 13 to the housing 10 together with the lubrication means 14.

It is to be noted that the outer shell 13 may be formed by a magnetic metal, so that the outer shell 13 sticks to the concavity 10f through the magnetic force when interfitting the outer shell 13 into the concavity 10f.

FIGS. 6 through 9 show a third embodiment of the invention in which the lubrication means 12 forms an vessel 21 in arc as a reservoir and provides a plurality of nozzles 22 in which the lubricant hole 10A serves as the passage hole 17.

Figure 6:
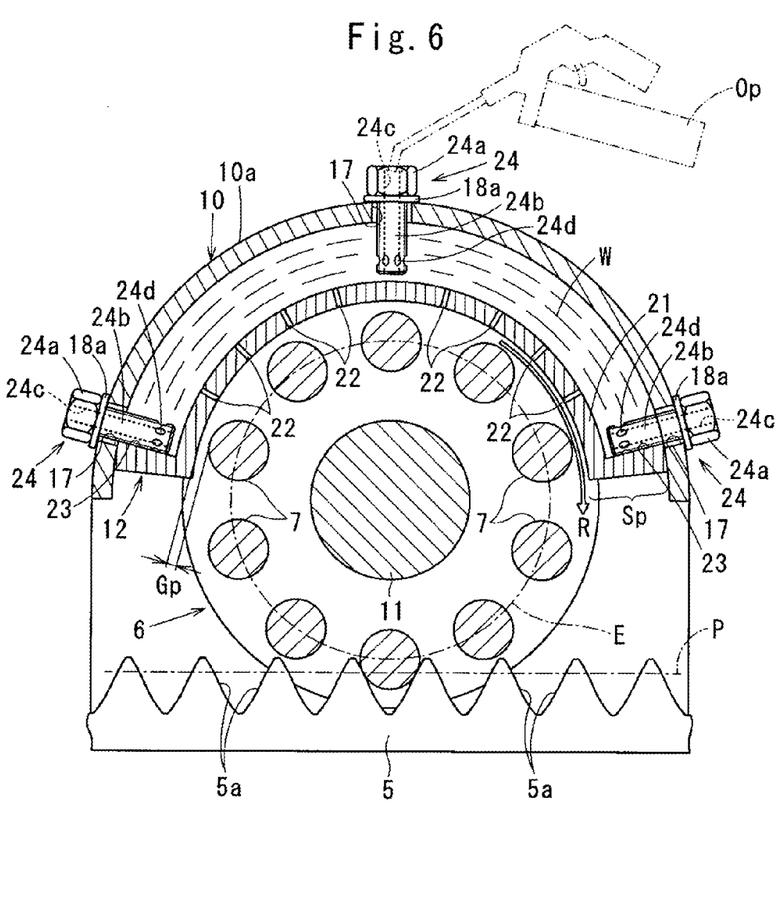
FIG. 6 is a longitudinal cross sectional view showing the self-lubricating transmission device with a special tool according to a third embodiment of the invention.

As shown in FIG. 6, the vessel 21 is rectangular in cross section to accommodate the lubrication oil W, and located along the outer peripheral surface of the pinion 6. The nozzles 22 are circumferentially provided as thin perforation holes on a bottom of the vessel 21 at regular intervals. By way of example, the number of the nozzles 22 is counted as eight in the third embodiment of the invention.

Figure 7:
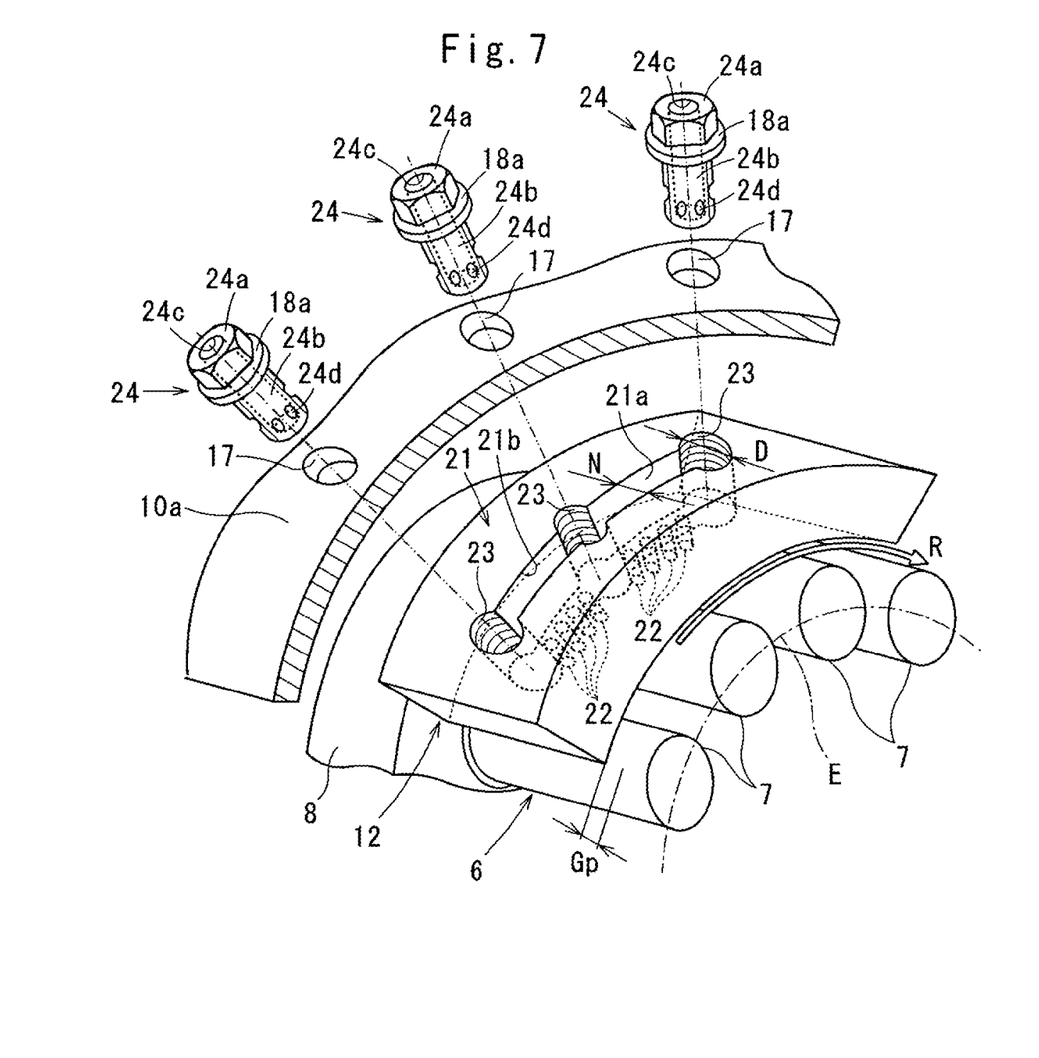
FIG. 7 is a perspective view showing a screw joint bolt, the ceiling plate, the lubrication mean and the pinion but partly broken.

As shown in FIG. 7, an upper surface of the vessel 21 has a hollow opening 21a, an open side of which has a plurality of screw holes 23 at regular intervals. By way of example, the number of the screw holes 23 is three in the third embodiment of the invention.

The screw holes 23 have an outer diameter D greater than a width N of the hollow opening 21a, so that the screw holes 23 partly jut out of the hollow opening 21a.

A tubular screw joint bolt 24 is provided to pass through the passage hole 17 in a fashion to face inside the vessel 21. The screw joint bolt 24 has a hexagonal head 24a and a stud 24b, the latter of which is tightened against the screw holes 23 so that the ceiling plate 10a closes an open surface 21b of the hollow opening 21a.

Figure 8:
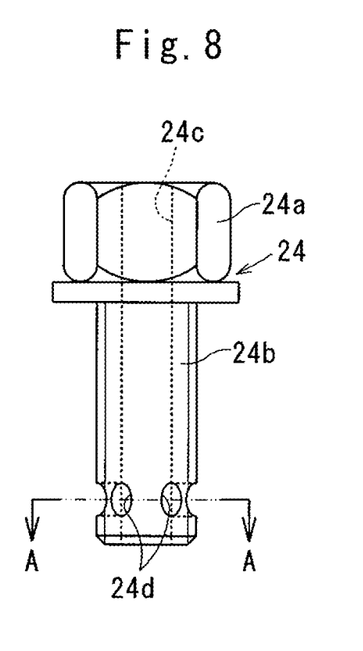
FIG. 8 is a plan view of the screw joint.
Figure 9:
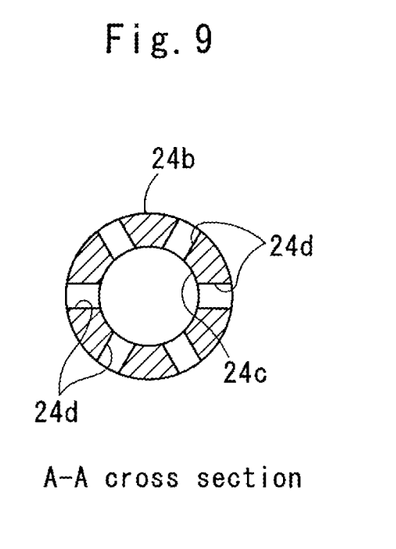
FIG. 9 is a latitudinal cross sectional view taken along the line A-A of FIG. 8.

The screw joint bolt 24 has an axial bore 24c and lateral bores 24d perforated in perpendicular to the stud 24b as clearly shown in FIGS. 8 and 9.

Upon refilling the vessel 21 with the lubrication oil W, the grease gun Op is used as the special tool to replenish the lubrication oil W which flows into the axial bore 24c and comes out of the lateral bores 24d to collect the lubrication oil W inside the vessel 21.

In the third embodiment of the invention, an arcuate passageway appears for a pneumatic stream R between the pinion 6 and a lower portion of the vessel 21 in combination with the rotational movement of the pinion 6. With the development of the pneumatic stream R, the nozzles 22 are objected to negative pressure which helps to drop the lubrication oil W onto the pinion 6 so as to consistently supply the lubrication oil W in proper quantities.

Modification Forms (a) Instead of running the pinion 6 along the rack 5, the base plate 2 may be slidable arranged against the ground surface and the housing 10 may be fixedly secured to the ground surface together with the pinion 6 so as to move the rack 5 and the base plate 2 in the lengthwise direction M.

(b) The lubricant hole 10A provided on the ceiling plate 10a and the perforation hole 20 formed on the outer shell 13 may be omitted.

(c) In lieu of the helical spring 15 provided as the unrging means, a torsional spring, leaf spring or synthetic rubber may be used to slidable contact the impregnation means 14 with the pin rollers 7.

(d) Upon forming the outer shell 13 by a synthetic resin, used are polyacetal, polyamide (PA), polycarbonate (PC), polyphenyleneether (PPE), polybutyleneterephthalate (PBT), polyethyleneterephthalate (PET), polyethylene (PE) and syndiotactic polystyrene (SPS).

(e) In place of eight nozzles 22, the number of the nozzles 22 may be altered to nine, ten or more depending on circumstances and situation.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

What is claimed is:

1. A self-lubricating transmission device comprising:
a rack, an upper surface of which has teeth continuously formed along a lengthwise direction of said rack;

a pinion having a plurality of pin rollers which are provided between two disc plates in a fashion to form an annular configuration so as to engage with said teeth of said rack;

a gate-shaped housing having a ceiling plate and side walls connected to both ends of said ceiling plate in order to accommodate said pinion inside said housing;

a drive shaft concentrically fixed to a central portion of said pinion, one end of said drive shaft being rotatably supported by one of said side walls, and the other end of said drive shaft being rotatably supported by the other of said side walls;

a lubrication means which accommodates lubrication oil and provided between said ceiling plate and said pinion to be in registration with said pinion; and said pinion being rotationally driven to move in relative to said rack with said pin rollers engaged with said teeth of said rack, so that said lubrication means supplies said lubrication oil to said pinion in combination with a rotational movement of said pinion, wherein said lubrication means comprising;

an outer shell arcuately formed in arc along an outer peripheral surface of said pinion;

an impregnated means which contains said lubrication oil and placed along said outer shell; and an urging means which urges said lubrication means to slidably contact said lubrication means with said pin rollers of said pinion.

2. The self-lubricating transmission device according to claim 1, wherein said impregnated means is an impregnation metal in which said lubrication oil is impregnated with a sintered alloy, or said lubrication means is an impregnation synthetic resin in which said lubrication oil is impregnated with a porous synthetic resin.

* * * * *